Figure 1:
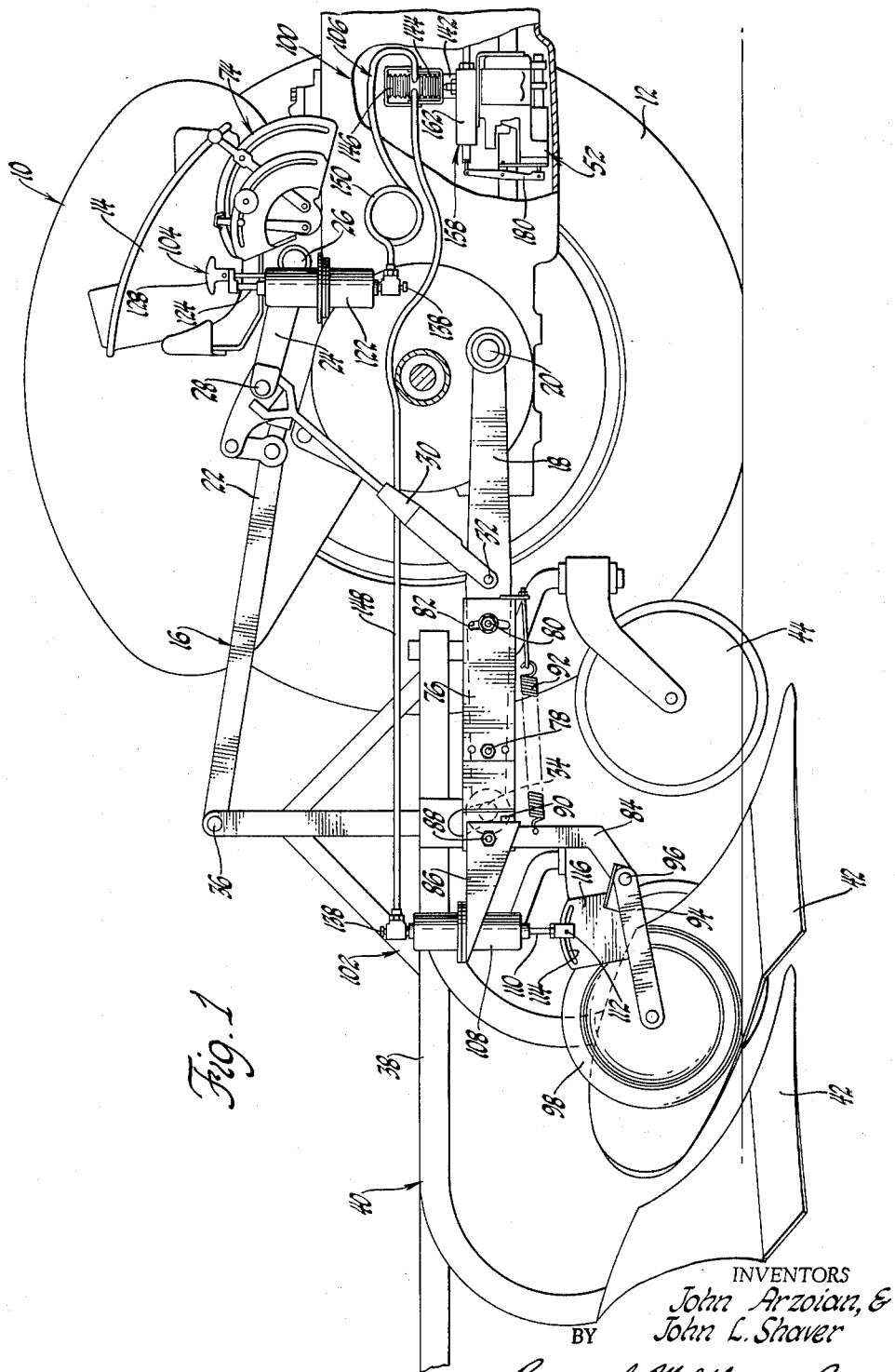

Feb. 8, 1966  J. ARZOIAN ETAL  3,233,680
AUTOMATIC DEPTH CONTROL MECHANISM
Filed Feb. 24, 1964  2 Sheets-Sheet 1

INVENTORS
John Arzoian, &
John L. Shaver
BY
Barnard, McGlynn & Reising
ATTORNEYS Feb. 8, 1966   J. ARZOIAN ETAL   3,233,680
AUTOMATIC DEPTH CONTROL MECHANISM
Filed Feb. 24, 1964   2 Sheets-Sheet 2

INVENTORS
John Arzoian, &
John L. Shaver
BY Barnard, McGlynn & Reising
ATTORNEYS United States Patent Office 3,233,680
Patented Feb. 8, 1966

3,233,680
AUTOMATIC DEPTH CONTROL MECHANISM
John Arzoian, Dearborn, and John L. Shaver, Detroit, Mich., assignors to Massey-Ferguson Inc., Detroit, Mich., a corporation of Maryland
Filed Feb. 24, 1964, Ser. No. 346,608
16 Claims. (Cl. 172—4)

This invention relates to a mechanism for automatically controlling the working depth of a power lifted and lowered device and, in particular, to an automatic depth control mechanism for an agricultural implement, such as a plow, particularly characterized by a pneumostatic control system responsive to variation in ground-working depth of the implement to generate an extremely moderate pressure signal for remotely controlling lifting and lowering of the implement to maintain the latter at a preselected working depth.

Implements, such as a plow, of the type to which the present invention pertains are typically pivotally mounted in trailing relationship on a wheeled vehicle, such as a tractor, for movement vertically relative thereto between a lowered ground-working position and a raised transport position, means including fluid pressure operated motor means being provided to operatively interconnect the vehicle and implement to control such pivotal movement of the latter. Furthermore, with the implement lowered to a ground-working or penetrating position, it has heretofore been proposed to provide the implement with a depth-sensing mechanism, typically in the form of a ground-engaging gauge wheel, to sense variation in the depth of penetration of the implement into the ground and to operate the aforementioned motor means in accordance with the depth variations sensed to either raise or lower the implement to maintain the depth of penetration of the implement substantially constant. However, and as will be readily appreciated by those acquainted with this art, the fluid control system for the aforementioned motor means has been mounted on the vehicle a considerable distance from the gauge wheel mounted on the trailing implement and, accordingly, relatively long mechanical linkage systems have been required to operatively connect the gauge wheel to the fluid control system to relay information therebetween or, alternatively, relatively elaborate electrical systems have been required to relay such information. Where mechanical linkage systems have been utilized, they have been characterized by considerable looseness or play, particularly after having been in use for some time, resulting in relatively inaccurate transfer of information to the fluid control system concerning variation in depth of penetration. With respect to the electrical systems, suffice it to say that they are relatively expensive, readily susceptible to malfunctions under even normal operating conditions and are otherwise not too satisfactory for use with such agricultural equipment.

In view of the foregoing considerations, the present invention is directed to a combination including a device adapted to be lifted and lowered under power and to penetrate a working surface, and is particularly characterized by a fluid control system operable to sense variation of such penetration from a predetermined or preselected depth and control power operation of the device to compensate for such variation to maintain the device substantially at such predetermined or preselected depth of penetration.

More particularly, the present invention is characterized by a pneumostatic control system operable to sense variation in the position of the aforementioned device from a predetermined or preselected depth, and to generate a relatively moderate signal pressure remote from the device for controlling power operation of the latter to automatically maintain the device substantially at the predetermined or preselected depth of penetration.

In its more specific aspects, the invention is particularly directed to the combination comprising a wheeled vehicle, a ground-working implement, such as a plow, pivotally mounted in trailing relation on the vehicle for movement vertically relative thereto to different ground-working depths, means including fluid pressure operated motor means operatively interconnecting the vehicle and implement to control pivotal movement of the latter, and fluid circuit means including a source of fluid under pressure and control valve means controlling supply and exhaust of fluid to and from the motor means, such control valve means having a neutral position holding fluid in the motor means to hold the implement in a substantially fixed position relative to the vehicle and first and second operating positions respectively supplying fluid to and exhausting fluid from the motor means to move the implement vertically in opposite directions relative to the vehicle, and is particularly characterized by the improvement comprising depth control means operable automatically to shift the control valve means among the positions thereof aforementioned to maintain the implement at a preselected ground-working depth.

More specifically in this regard, the invention is particularly characterized by the fact that the aforementioned depth control means comprises a pneumostatic control system responsive to variation in the ground-working depth of the implement to automatically shift the control valve means among the positions thereof.

In this regard, the invention is further particularly characterized by the fact that the aforementioned pneumostatic control system comprises an air pressure differential responsive monitoring means operable to shift the control valve means aforementioned among the positions thereof, and a pair of pressure-generating means communicating with the monitoring means to impose opposing pressures on the latter, the pressure generated by one of the generating means being responsive to variation in the ground-working depth of the implement, and the pressure generated by the other of such generating means being manually selectable to provide a reference pressure in accordance with the working depth desired.

Figure 2:
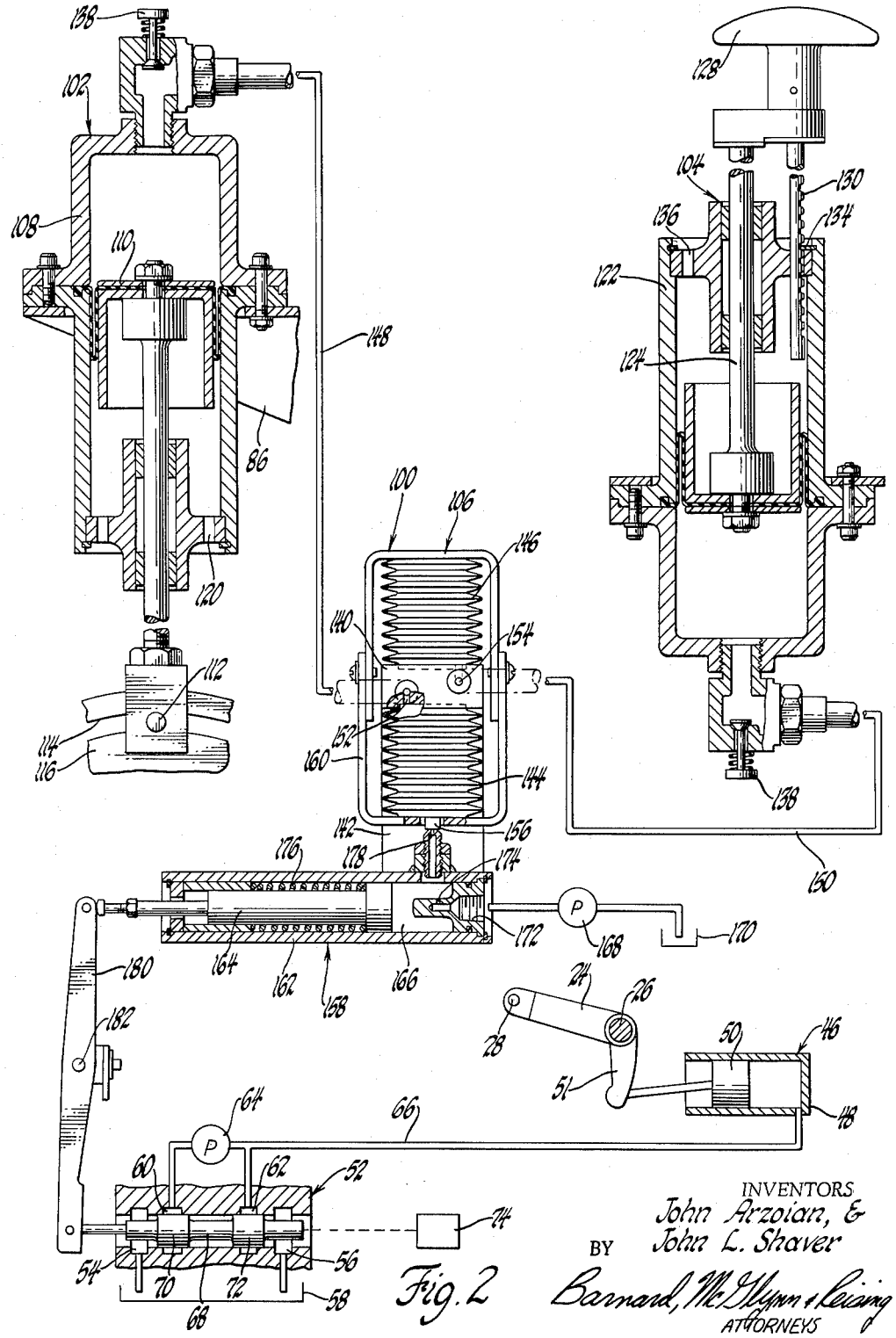

In order to facilitate an understanding of the invention, reference will now be made to the accompanying drawings in which:

FIGURE 1 is a fragmentary side elevation, partially in section and broken away to illustrate certain details, of a plow mounted in trailing relation on an agricultural tractor, and illustrates a preferred embodiment of the invention; and FIGURE 2 is a view, partially schematic and diagrammatic in nature, illustrating a fluid control system associated with the construction of FIGURE 1.

Referring now particularly to FIGURE 1, the numeral 10 generally indicates a conventional agricultural tractor including the usual rear traction wheels 12, only one of which is shown, and the operator's seat 14. A conventional draft linkage is illustrated generally at 16 and comprises the usual pair of rearwardly projecting lower control links 18, only one of which is shown, pivotally connected to the chassis of the tractor on the horizontal transverse axis indicated at 20, an upper control link 22 likewise pivotally mounted on the rear of the tractor in a conventional and known manner for vertical movement relative thereto, a pair of levers 24, only one of which again being shown, mounted on a horizontal crankshaft 26 pivotally mounted on the tractor and respectively pivotally connected at 28 to one end of associated struts 30 having the other ends thereof pivotally connected at 32 to the respective lower control links 18 intermediate the ends of the latter. It will be appreciated that the respective struts 30 preferably include relatively reciprocable elements for adjustment purposes.

The respective lower control links 18 may be suitably pivotally connected on the horizontal transverse axis 34 and the upper control link 22 may be suitably pivotally connected on a similar axis 36 to the frame 38 of the implement indicated generally at 40, a plow in this instance, and further including the plow shares 42 suitably supported on the frame for plowing penetration with the ground. It will be appreciated that the implement or plow is preferably provided with the furrow wheel 44 and other conventional components as desired.

Referring additionally to FIGURE 2, conventional fluid pressure operated motor means indicated generally at 46 is provided in a conventional manner schematically at 46 is provided in a conventional manner on the tractor 10, and includes a cylinder 48 in which the piston 50 is reciprocably mounted and suitably operatively connected to the crank arm 51 secured to crankshaft 26 to control pivotal movement of the levers 24 in opposite directions and, hence lifting and lowering movement of the lower control links 18 to raise and lower the implement 40 about axis 20 between a lowered plowing position and a raised transport position, all of which is conventional and will be apparent.

In order to control actuation of motor means 46, a control valve indicated generally at 52 is provided having a pair of ports 54 and 56 communicating with a tank or reservoir 58 and the ports 60 and 62 respectively communicating with the inlet and delivery sides of the pump 64. The delivery side of the pump is also connected by the conduit 66 to the motor means 46. A valve spool 68 including the axially spaced lands 70 and 72 is adapted to be axially shifted within the bore of the control valve by a manually operable control mechanism indicated generally at 74 in FIGURE 1 and schematically in FIGURE 2. In this regard, it will be appreciated that the control mechanism 74 may take the form of a manually operable mechanism of a known type for simply directly shifting the position of the valve spool to control flow of fluid through the control valve, or such a known mechanism of the type, for example, which may be manually set at some predetermined position to shift the valve spool 68 automatically in relation to variation in draft forces imposed upon the implement or plow 40 or in response to variation in the position of the implement or plow relative to the tractor.

The construction aforedescribed is conventional. In the operation thereof, it will be appreciated that the manual control mechanism 74 is operable to position the valve spool 68 in the position illustrated in the drawings in which flow between the associated ports 54 and 60 and 56 and 62 is blocked by the respective valve lands 70 and 72, thereby holding fluid in the conduit 66 and cylinder 48 to hold the lower control links 18 in any corresponding angular position relative to the tractor 10, and, hence, to hold the implement 40 in any desired position between a raised transport and a lowered plowing position. When it is desired to raise the implement, the control mechanism 74 may be operated to shift the valve spool 68 to the right in FIGURE 2 to communicate ports 54 and 56 while still blocking flow between ports 56 and 62, thereby supplying fluid from the reservoir 58 to the inlet of the pump 64 which delivers fluid under pressure through conduit 66 to the cylinder 48 to raise the implement. Conversely, shifting of the valve spool to the left in FIGURE 2 will result in communicating port 56 with port 62 while blocking flow between the ports 54 and 60, thereby exhausting fluid from the cylinder 48 through the conduit 66 to reservoir to permit the implement to lower under the influence of gravity.

Referring now to the automatic depth control mechanism of the present invention, and referring again particularly to FIGURE 1, it will be noted that a carriage member 76 is suitably adjustably pivotally mounted as indicated at 78 to one of the lower control links 18 for movement vertically relative thereto, such vertical movement being limited by a bolt or other fastening device 80 carried by such lower control link and cooperating with an arcuate slot 82 in the carriage member. The fastening device 80 also serves to hold the carriage member in a selected angular position relative to the lower control link and implement frame 38. A lever member 84 including a support plate 86 rigidly secured thereto is suitably pivotally connected as indicated at 88 to the carriage member and is continuously biased counterclockwise to the position of FIGURE 1 against a stop 90 carried by the carriage member by means of the spring 92 having its opposite ends suitably secured to the lever member 84 and the carriage member 76. A lever 94 is pivotally connected at 96 to the aforementioned lever member 84, and suitably rotatably supports the ground-engaging gauge wheel 98 adapted to travel along the surface of the ground to be worked or penetrated by the implement.

A pneumostatic control system is indicated generally at 100 and comprises the motor or pressure generating means 102 and 104 respectively associated with the implement 40 and vehicle 10 and operatively connected to the pressure differential responsive monitoring means 106. More specifically, the motor or pressure generating means 102 comprises a cylinder 108 suitably fixedly mounted on the support plate 86 and having reciprocably disposed therein the diaphragm type piston 110, the rod of the piston being pivotally and slidably mounted at 112 in an arcuate slot 114 in a plate 116 mounted on the lever 94 for movement in unison therewith and with the gauge wheel 98. The piston rod side of cylinder 108 is continuously vented to atmosphere through vent 120.

The other motor or pressure generating means 104 is substantially identical to that previously described in comprising the cylinder 122 suitably mounted on the tractor 10 and the diaphragm type piston 124 reciprocably disposed therein. However, unlike the motor or pressure generating means 102, the piston 124 is suitably connected to a handle 128 for manual operation and adjustment, a ratchet rod 130 being provided so as to extend within the cylinder 122 for cooperation with a detent or latch member 134 to hold the piston in any selected manually adjustable position desired relative to the cylinder. The piston rod side of cylinder 122 is continuously vented to atmosphere through vent 136.

The poppet valves 138 are associated with each of the pressure generating means 102 and 104 and are spring urged in a direction preventing communication of the interiors of the latter with atmosphere while, at the same time, being manually depressible to charge the interiors of the respective cylinders 108 and 122 on the head sides of their respective pistons with atmospheric pressure as will appear more fully hereinafter.

The aforementioned monitoring means 106 comprises a support 140 suitably secured to a bracket 142 fixed to the tractor 10 and mounting on opposite sides thereof the respective flexible bellows 144 and 146. The piston head sides of the respective pressure generating means 102 and 104 respectively communicate through the flexible conduits 148 and 150 and ports 152 and 154 in the support 140 with the interiors of the respective bellows 144 and 146. A valve member 156 is carried by the lowermost bellows 144 for cooperation with a bleed port of an actuating motor assembly 158 to be described hereinafter, such valve member projecting through an aperture in a lower portion of a yoke-like frame 160 which surrounds and extends between the opposite ends of the respective bellows for shifting movement relative to the support 140 as the bellows expand and contract in a manner to be described hereinafter.

The actuating motor assembly 158 comprises a cylinder 162 fixedly mounted on tractor 10 and in which there is reciprocably disposed a piston 164. The head side of the piston defines with one end of the cylinder a pressure chamber 166. A pump 168 is provided for delivering fluid at a substantially constant pressure from the reservoir 170 into the port 172 in the aforementioned one end of the cylinder 162 for supply through an orifice 174 of fixed sides into the pressure chamber 166. Fluid under pressure so delivered acts on the head of piston 164 against the force of a spring 176 disposed within the cylinder and acting on the piston to continuously bias the latter toward the right in FIGURE 2 against such pressure. A bleed port 178 communicates with the pressure chamber 166 and serves to bleed variable amount of fluid therefrom back to reservoir 170 in a conventional manner as controlled by the valve member 156 as the aforementioned bellows shift or expand and contract as will be described. The piston 164 projects from the cylinder 162 and is connected to one end of a lever 180 pivotally mounted at 182 on the tractor and having its other end operatively connected to the control valve spool 68 to shift the latter among the positions thereof aforedescribed in response to reciprocation of the piston 164 in opposite directions in accordance with the extent of bleed of fluid permitted from the pressure chamber 166.

In operation, it may be assumed that the plow 40 is disposed in its raised transport position relative to the tractor 10 and is about to be used in a plowing operation. At this time, the piston 110 of pressure generating means 102 is in its lowermost position in cylinder 108 due to the weight of gauge wheel 98. The tractor operator may then lift the manually operable piston 124 of the pressure generating means 104 to its uppermost position, if not already disposed in such position, and will then manually depress and then release the respective poppet valves 138 to charge the piston head sides of the respective pressure generating means with air at atmospheric pressure and, hence, charge the respective bellows 144 and 146 with air at such pressure. Thereafter, the control mechanism 74 will be manipulated to shift control valve 68 to the left to lower the implement in a manner aforedescribed to plowing relation with the ground.

At this time, the tractor operator will manually depress the piston 124 of pressure generating means 104 into its associated cylinder 122 to a certain extent to pressurize the conduit 150 and the upper bellows 146 to a predetermined or preselected reference pressure in accordance with the depth of penetration desired to be maintained for the plow 40 as the latter works the soil or ground. The ratchet rod 130 is, of course, locked by detent means 134 in the selected position to accomplish the foregoing. In this regard, the ratchet rod may be provided with suitable indicia or indicating means to relate the position of the piston 124 within cylinder 122 to desired plowing depth.

As the actual plowing operation occurs, it may be assumed that the plow is operating at the predetermined or preselected depth desired. In such event, the gauge wheel 98 has moved piston 110 into cylinder 108 of pressure generating means 102 to such an extent as to generate a pressure in bellows 144 which, acting in concert with the reference pressure in the bellows 146, positions the bellows frame 160 and valve member 156 to so restrict bleed of fluid from the pressure chamber 166 so that the pressure of the fluid in the latter and the force of the spring 176 are substantially balanced to hold the actuating piston 164 substantially stationary. Thus, the control valve spool 68 will be disposed as illustrated in FIGURE 2 blocking any flow of fluid whatsoever therethrough, and holding fluid in the motor means 46 to maintain the lower control links 18 substantially fixed relative to the tractor and the implement at such desired depth.

It may now be assumed that the plow begins to penetrate the soil more deeply than desired and selected. Under such circumstances, the plow frame begins to move toward the ground and the gauge wheel 98 will pivot upwardly in FIGURE 1 relative thereto about the pivotal connection 96 of the lever 94 to lever member 84 causing the piston 110 to be shifted upwardly a corresponding amount within its cylinder 108, thus generating an increased pressure in the conduit 148 and bellows 144. The pressure differential in the respective bellows 144 and 146 is then in favor of the lower bellows 144 causing the bellows assembly to shift the bellows frame 160 downwardly to permit the valve member 156 to further restrict bleed from the orifice 178. Thus, the pressure which builds up in pressure chamber 166 as a result of restriction of the bleed acts on the actuating piston 164 to move the latter to the left in FIGURE 2 against the opposition of the spring 176 to shift the control valve spool 68 to the right. As a result, fluid is delivered from the reservoir 58 through the portions 54 and 60 and pump 64 to the conduit 66 to extend the motor means 46 and pivot the levers 24 clockwise to raise the lower links 18 and the plow. Naturally, as the frame 38 of the plow is thus raised, the gauge wheel 98 swings downwardly relative thereto to reduce the pressure generated by the pressure generating means 102 and communicated to the lower bellows 144 until such time as the pressure differential between the bellows 144 and 146 redisposes the valve member 156 in position to balance the pressure in the pressure chamber 166 with the force of spring 176 to dispose the control valve spool 68 in the neutral holding position of FIGURE 2. At this time, the plow is again at the preselected plowing depth.

Naturally, if the plow begins to operate shallower than desired and as set by the reference pressure in the bellows 146, the reverse occurs. In other words, under such circumstances, the gauge wheel 98 will swing downwardly relative to plow frame 38 or counterclockwise in FIGURE 1 in sensing such condition. As a result, the pressure generated in the lower bellows 144 will decrease relative to the reference pressure in the bellows 146 causing the pressure differential then existing to shift the bellows frame 160 upwardly in FIGURE 2 and with it the valve member 156 to provide less restricted bleed through the orifice 178. Thus, the spring 176 is permitted to move the actuating piston 164 toward the right in FIGURE 2 to shift the control valve spool 68 to the left, thereby resulting in dumping fluid from the motor means 46 through the conduit 66 and ports 62 and 56 to reservoir 58. As a result, the lower links 18 are lowered lowering the plow back to the desired plowing depth. Once such depth is again reached, as sensed by movement of the gauge wheel 98 relative to the plow, the pressure generated in the bellows 144 and relative to the reference pressure in the bellows 146 is such as to redispose the bellows frame and valve member 156 in position to balance the actuating piston 164 to hold the control valve spool 68 in the neutral position illustrated, thereby holding the plow at the desired plowing depth.

When a plowing operation is completed and it is desired to elevate the implement to its raised transport position, it will be appreciated that control mechanism 74 will be utilized as aforedescribed to shift control valve spool 68 to supply fluid to motor means 46.

At this juncture, it should be noted that the aforedescribed pneumostatic system 100 operates at extremely moderate pressures in controlling bleed of fluid from the orifice 178 and the application of much greater pressures and forces in the motor means 46 to raise and lower the implement; that is, the monitoring means 106 operates in response to the differential in pressures generated by the respective pressure generating means 102 and 104 as aforedescribed so that the individual pressures generated need be but slight in nature. Furthermore, the entire fluid system aforedescribed, except for the pressure generating means 102 of the pneumostatic control system, is mounted on the tractor 10, the pressure generating means 102 being connected to the remaining portion of the system simply by a single flexible conduit or hose 148. Thus, the pressure generating means 102 mounted remotely from the rest of the system senses variations in plowing depth and signals such variations by pressure generated in response thereto through the conduit or hose 148 for comparison in the monitoring means 106 with the reference pressure set by the vehicle operator.

It will be appreciated that suitable and conventional means, such as variable stops associated with lever 180, may be provided to adjust and control the distance that the control valve spool 68 is permitted to move from its neutral position shown in FIGURE 2 to the left, and thereby control the extent of opening of communication between the ports 56 and 62 and the rate at which fluid may escape from the motor means 46 and the rate at which the implement is lowered. Still further, a dashpot or other dampening means may be provided to limit how fast the control valve spool 68 can move to the left in FIGURE 2 or a position permitting discharge of fluid from the motor means 46 and, hence, the rate at which the implement is lowered.

During a plowing operation, it will be realized that spring 92 continuously biases lever member 84 toward stop 90 to dispose the cylinder 108 of pressure generating means 102 in the position illustrated in FIGURE 1. However, it may occur that piston 110 is driven all the way to the top of cylinder 108 as, for example, the gauge wheel 98 passing over a relatively large obstruction or hump on the surface of the ground being plowed. In such event, the spring 92 will yield to permit clockwise pivotal movement of lever member 84 in FIGURE 1 to accommodate similar movement of cylinder 108 and piston 110 about pivot axis 88 to prevent damage to the pressure generating means 102.

It will also be apparent that fastener 80 may be loosened and then retightened to permit pivotal adjustment of carriage member 76 about axis 78 within limits imposed by slot 82, thus adjusting the relative position of cylinder 108 relative to piston 110 with the gauge wheel contacting a particular surface and, hence, the length of stroke of the piston in opposite directions at different plowing depths.

Preferably, the respective cylinders 108 and 122, conduits 148 and 150 and bellows 144 and 146 are substantially equal in size and length so that, except for transitory changes in depth of the plow as aforedescribed, the total air-containing volumes of the respective sides of the pneumostatic control system 100 are substantially equal to each other. As a result, any variation in the air pressure in the respective sides of the system due to temperature changes tend substantially to cancel each other out.

What we claim as our invention is:

1. In the combination comprising a wheeled vehicle, a ground-working implement pivotally mounted in trailing relationship on said vehicle for movement vertically relative thereto to different ground-working depths, means including fluid pressure operated motor means operatively interconnecting said vehicle and implement to control pivotal movement of the latter, and means including a source of fluid under pressure and control valve means controlling the supply and exhaust of fluid to and from said motor means, said control valve means having a neutral position holding fluid in said motor means to hold said implement in a substantially fixed position relative to said vehicle and first and second operating positions respectively supplying fluid to and exhausting fluid from said motor means to move said implement relative to said vehicle; the improvement comprising depth control means operable automatically to shift said control valve means among said positions thereof to maintain said implement at a preselected ground-working depth and including an actuating piston reciprocably disposed within a cylinder and defining therewith a pressure chamber, spring means urging said piston in one direction within said cylinder, a source of fluid at substantially constant pressure communicating with said chamber and urging said piston in the opposite direction in opposition to said spring means, motion transmitting means interconnecting said piston and control valve means to shift the latter among said positions thereof as said piston reciprocates in opposite directions within said cylinder, a bleed orifice communicating with said chamber, and means responsive to the ground-engaging depth of said implement controlling bleed of fluid from said orifice and movement of said piston.

2. In the combination according to claim 1 wherein said last-named means comprises pressure differential responsive monitor valve means controlling bleed of fluid from said orifice, and a pair of pressure-generating means respectively imposing independent opposing pressures on said monitor valve means, the pressure generated by one of said generating means being responsive to variation in the ground-engaging depth of said implement, and the pressure generated by the other of said generating means being manually selectable and adjustable.

3. In the combination according to claim 1 wherein said one of said generating means is mounted on said implement, and the other of said generating means and said monitoring valve means is mounted remotely therefrom on said vehicle.

4. The combination according to claim 1 further comprising means for shifting said control valve means among said positions thereof independently of operation of said depth control means.

5. The combination according to claim 1 further comprising means for shifting said control valve means among said positions thereof independently of movement of said piston.

6. In the combination comprising a wheeled vehicle, a ground-working implement pivotally mounted in trailing relationship on said vehicle for movement vertically relative thereto to different ground-working depths, means including fluid pressure operated motor means operatively interconnecting said vehicle and implement to control pivotal movement of the latter, and means including a source of fluid under pressure and control valve means controlling the supply and exhaust of fluid to and from said motor means, said control valve means having a neutral position holding fluid in said motor means to hold said implement in a substantially fixed position relative to said vehicle and first and second operating positions respectively supplying fluid to and exhausting fluid from said motor means to move said implement relative to said vehicle; the improvement comprising depth control means operable automatically to shift said control valve means among said positions thereof to maintain said implement at a preselected ground-working depth and including an actuating piston reciprocably disposed within a cylinder and defining therewith a pressure chamber, spring means urging said piston in one direction within said cylinder, a source of fluid at substantially constant pressure communicating with said chamber and urging said piston in the opposite direction in opposition to said spring means, motion transmitting means inerconnecting said piston and control valve means to shift the latter among said positions thereof as said piston reciprocates in opposite directions within said cylinder, a bleed orifice communicating with said chamber, pressure differential responsive monitor valve means controlling bleed of fluid through said orifice, and a pair of pressure generating means each comprising relatively reciprocable piston and cylinder elements communicating through individual conduit means with said monitor valve means to impose independent opposing pressures on the latter, the pressure generated by one of said generating means being responsive to variation in the ground-engaging depth of said implement, and the pressure generated by the other of said generating means being manually selectable and adjustable.

7. The combination according to claim 6 further comprising carriage means pivotally mounted for vertical adjustment relative to said implement, and a ground-engaging gauge wheel pivotally mounted on said carriage means for vertical swinging movement relative thereto, one of said elements of said one of said generating means being mounted on said carriage means and the other element thereof being operatively connected to said gauge wheel for movement with the latter to generate a pressure responsive to variation in the ground-engaging depth of said implement.

8. The combination according to claim 6 further comprising carriage means pivotally mounted for vertical adjustment relative to said implement, support means including first lever means pivotally mounted on said carriage means, a second lever pivotally mounted on said first lever and rotatably supporting a ground-engaging gauge wheel, spring means operatively interconnecting said carriage means and said first lever means to normally bias the latter and said second lever means toward engagement with the ground and being yieldable to permit said first and second lever means to pivot in the opposite direction about said carriage means, one element of said one of said generating means being mounted on said carriage means and the other element thereof being operatively connected to said second lever means for movement with the latter and said gauge wheel.

9. In the combination comprising a support, a device pivotally mounted on said support for movement vertically relative thereto to different working depths relative to a working surface, power operated means including fluid pressure operated motor means operatively interconnecting said support and device to control pivotal movement of the latter, fluid circuit means including a source of fluid under pressure and control valve means controlling the supply and exhaust of fluid to and from said motor means, said control valve means having a neutral position holding fluid in said motor means to hold said device in a substantially fixed position relative to said support and first and second operating positions respectively supplying fluid to and exhausting fluid from said motor means to move said device vertically in opposite directions relative to said support, and depth control means operable automatically to shift said control valve means among said positions thereof to maintain said device at a preselected working depth, said depth control means comprising means for generating a pair of independent fluid control pressures acting in opposition to each other, said last-named means including working surface contacting means mounted on said device to generate one of said control pressures in response to variation in the depth of said device.

10. In the combination comprising a support, a device pivotally mounted on said support for movement vertically relative thereto to different working depths relative to a working surface, power operated means including fluid pressure operated motor means operatively interconnecting said support and device to control pivotal movement of the latter, fluid circuit means including a source of fluid under pressure and control valve means controlling the supply and exhaust of fluid to and from said motor means, said control valve means having a neutral position holding fluid in said motor means to hold said device in a substantially fixed position relative to said support and first and second operating positions respectively supplying fluid to and exhausting fluid from said motor means to move said device vertically in opposite directions relative to said support, and depth control means operable automatically to shift said control valve means among said positions thereof to maintain said device at a preselected working depth, said depth control means comprising a fluid control system including pressure differential responsive monitoring means operable to shift said control valve means among said positions thereof to maintain said device at a preselected working depth, and a pair of fluid pressure-generating means communicating with said monitoring means to impose opposing pressures on the latter, one of said generating means including working surface contacting means mounted on said device to generate a pressure responsive to variation in the depth of said device, and the pressure generated by the other of said generating means being manually selectable.

11. In the combination comprising a support, a device pivotally mounted on said support for movement vertically relative thereto to different working depths relative to a working surface, power operated means including fluid pressure operated motor means operatively interconnecting said support and device to control pivotal movement of the latter, fluid circuit means including a source of fluid under pressure and control valve means controlling the supply and exhaust of fluid to and from said motor means, said control valve means having a neutral position holding fluid in said motor means to hold said device in a substantially fixed position relative to said support and first and second operating positions respectively supplying fluid to and exhausting fluid from said motor means to move said device vertically in opposite directions relative to said support, and depth control means operable automatically to shift said control valve means among said positions thereof to maintain said device at a preselected working depth, said depth control means comprising a pneumostatic control system including a pair of independent circuits, a pair of pressure-generating means respectively communicating with each of said circuits, pressure differential responsive monitoring means communicating with said respective circuits and responsive to changes in pressure differential therein to automatically shift said control valve means among said positions thereof to maintain said device at a preselected working depth, one of said generating means being responsive to variation in the working depth of said device to vary the pressure generated in its associated circuit, the other of said generating means being manually operable to select a reference pressure in its associated circuit.

12. In the combination comprising a support, a device pivotally mounted on said support for movement vertically relative thereto to different working depths relative to a working surface, power operated means including fluid pressure operated motor means operatively interconnecting said support and device to control pivotal movement of the latter, fluid circuit means including a source of fluid under pressure and control valve means controlling the supply and exhaust of fluid to and from said motor means, said control valve means having a neutral position holding fluid in said motor means to hold said device in a substantially fixed position relative to said support and first and second operating positions respectively supplying fluid to and exhausting fluid from said motor means to move said device vertically in opposite directions relative to said support, and depth control means operable automatically to shift said control valve means among said positions thereof to maintain said device at a preselected working depth, said depth control means comprising an actuating piston reciprocably disposed within a cylinder and defining therewith a pressure chamber, a source of fluid at substantially constant pressure communicating with said chamber, means operable to bias said piston in opposition to the pressure of said fluid in said chamber, motion-transmitting means interconnecting said piston and control valve means to shift the latter among said positions thereof to maintain said device at a preselected working depth as said piston reciprocates in opposite directions within said cylinder, a port communicating with said chamber, and means responsive to the depth of said device controlling flow of fluid through said port from said chamber to control movement of said piston in said opposite directions in accordance with variations in the working depth of said device.

13. In the combination comprising a wheeled vehicle, a ground-working implement pivotally mounted on said vehicle for movement vertically relative thereto to different ground-working depths, means including fluid pressure operated motor means operatively interconnecting said vehicle and implement to control pivotal movement of the latter, fluid circuit means including a source of fluid under pressure and control valve means controlling supply and exhaust of fluid to and from said motor means, said control valve means having a neutral position holding fluid in said motor means to hold said implement in a substantially fixed position relative to said vehicle and first and second operating positions respectively supplying fluid to and exhausting fluid from said motor means to move said implement vertically in opposite directions relative to said vehicle, and depth control means operable automatically to shift said control valve means among said positions thereof to maintain said implement at a preselected ground-working depth, said depth control means comprising means for generating a pair of independent fluid control pressures acting in opposition to each other, said last-named means including ground surface contacting means mounted on said implement to generate one of said control pressures in response to variation in the depth of said implement.

14. In the combination comprising a wheeled vehicle, a ground-working implement pivotally mounted on said vehicle for movement vertically relative thereto to different ground-working depths, means including fluid pressure operated motor means operatively interconnecting said vehicle and implement to control pivotal movement of the latter, fluid circuit means including a source of fluid under pressure and control valve means controlling supply and exhaust of fluid to and from said motor means, said control valve means having a neutral position holding fluid in said motor means to hold said implement in a substantially fixed position relative to said vehicle and first and second operating positions respectively supplying fluid to and exhausting fluid from said motor means to move said implement vertically in opposite directions relative to said vehicle, and depth control means operable automatically to shift said control valve means among said positions thereof to maintain said implement at a preselected ground-working depth, said depth control means comprising a fluid control system including pressure differential responsive monitoring means operable to shift said control valve means among said positions thereof to maintain said implement at a preselected ground-working depth, and a pair of fluid pressure-generating means communicating with said monitoring means to impose opposing pressures on the latter, one of said generating means including ground surface contacting means mounted on said implement to generate a pressure responsive to variation in the ground-engaging depth of said implement, and the pressure generated by the other of said generating means being manually selectable.

15. In the combination comprising a wheeled vehicle, a ground-working implement pivotally mounted on said vehicle for movement vertically relative thereto to different ground-working depths, means including fluid pressure operated motor means operatively interconnecting said vehicle and implement to control pivotal movement of the latter, fluid circuit means including a source of fluid under pressure and control valve means controlling supply and exhaust of fluid to and from said motor means, said control valve means having a neutral position holding fluid in said motor means to hold said implement in a substantially fixed position relative to said vehicle and first and second operating positions respectively supplying fluid to and exhausting fluid from said motor means to move said implement vertically in opposite directions relative to said vehicle, and depth control means operable automatically to shift said control valve means among said positions thereof to maintain said implement at a preselected ground-working depth, said depth control means comprising a pneumostatic control system including a pair of independent circuits, a pair of pressure-generating means respectively communicating with each of said circuits, and pressure differential responsive monitoring means communicating with said respective circuits and responsive to changes in pressure differential therein to automatically shift said control valve means among said positions thereof to maintain said implement at a preselected ground-working depth, one of said generating means being responsive to variation in the ground-working depth of said implement to vary the pressure generated in its associated circuit, the other of said generating means being manually operable to select a reference pressure in its associated circuit.

16. In the combination comprising a wheeled vehicle, a ground-working implement pivotally mounted on said vehicle for movement vertically relative thereto to different ground-working depths, means including fluid pressure operated motor means operatively interconnecting said vehicle and implement to control pivotal movement of the latter, fluid circuit means including a source of fluid under pressure and control valve means controlling supply and exhaust of fluid to and from said motor means, said control valve means having a neutral position holding fluid in said motor means to hold said implement in a substantially fixed position relative to said vehicle and first and second operating positions respectively supplying fluid to and exhausting fluid from said motor means to move said implement vertically in opposite directions relative to said vehicle, and depth control means operable automatically to shift said control valve means among said positions thereof to maintain said implement at a preselected ground-working depth, said depth control means comprising an actuating piston reciprocably disposed within a cylinder and defining therewith a pressure chamber, a source of fluid at substantially constant pressure communicating with said chamber, means operable to bias said piston in opposition to the pressure of said fluid in said chamber, motion-transmitting means interconnecting said piston and control valve means to shift the latter among said positions thereof to maintain said implement at a preselected ground-working depth as said piston reciprocates in opposite directions within said cylinder, a port communicating with said chamber, and means responsive to the ground-engaging depth of said implement controlling flow of fluid through said port from said chamber to control movement of said piston in said opposite direction in accordance with variations in the ground-working depth of said implement.

References Cited by the Examiner

UNITED STATES PATENTS

| | | | |
|---|---|---|---|
| 2,567,107 | 9/1951 | Gobeil | 172—4 |
| 2,754,742 | 7/1956 | Altgelt | 172—9 |
| 2,755,721 | 7/1956 | Rusconi | 172—4 |
| 3,090,446 | 5/1963 | Hausmann | 172—4 |

FOREIGN PATENTS

| | | |
|---|---|---|
| 217,233 | 9/1961 | Austria. |
| 883,643 | 12/1961 | Great Britain. |
| 144,729 | 3/1962 | U.S.S.R. |

OTHER REFERENCES

German application 1,086,934, August 1960.
German application 1,115,978, October 1961.

ABRAHAM G. STONE, *Primary Examiner.*